(12) United States Patent
Park et al.

(10) Patent No.: US 12,084,569 B2
(45) Date of Patent: *Sep. 10, 2024

(54) THERMOPLASTIC RESIN COMPOSITION AND MOLDED ARTICLE FORMED THEREFROM

(71) Applicant: LOTTE CHEMICAL CORPORATION, Seoul (KR)

(72) Inventors: Dong Hyun Park, Uiwang-si (KR); Yun Jeong Yang, Uiwang-si (KR); Gi Sun Kim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 637 days.

This patent is subject to a terminal disclaimer.

(21) Appl. No.: 17/296,660

(22) PCT Filed: Nov. 5, 2019

(86) PCT No.: PCT/KR2019/014880
§ 371 (c)(1),
(2) Date: May 25, 2021

(87) PCT Pub. No.: WO2020/111552
PCT Pub. Date: Jun. 4, 2020

(65) Prior Publication Data
US 2022/0025168 A1 Jan. 27, 2022

(30) Foreign Application Priority Data
Nov. 30, 2018 (KR) .................. 10-2018-0151519

(51) Int. Cl.
*C08L 33/12* (2006.01)
*C08L 77/12* (2006.01)

(52) U.S. Cl.
CPC ........... *C08L 33/12* (2013.01); *C08L 2201/04* (2013.01); *C08L 2201/10* (2013.01); *C08L 2205/035* (2013.01); *C08L 2207/53* (2013.01)

(58) Field of Classification Search
CPC .. C08L 33/12; C08L 2201/04; C08L 2201/10; C08L 2205/035; C08L 2207/53; C08L 2205/02; C08L 2205/03; C08L 77/12; C08L 33/08; C08L 51/04; C08L 55/04; C08F 279/02; C08F 220/14; C08K 3/16
USPC ........................................................ 524/401
See application file for complete search history.

(56) References Cited

U.S. PATENT DOCUMENTS

| | | | |
|---|---|---|---|
| 3,041,303 A | 6/1962 | Nelson | |
| 3,354,108 A | 11/1967 | Paradis et al. | |
| 4,331,786 A | 5/1982 | Foy et al. | |
| 4,356,300 A | 10/1982 | Isler et al. | |
| 4,612,340 A | 9/1986 | Ohachi | |
| 5,151,457 A | 9/1992 | Ishida et al. | |
| 5,334,635 A | 8/1994 | Udipi | |
| 5,714,534 A | 2/1998 | Kojima et al. | |
| 5,714,545 A | 2/1998 | Lee et al. | |
| 5,906,679 A | 5/1999 | Watanabe et al. | |
| 5,916,947 A | 6/1999 | Morris et al. | |
| 6,103,821 A | 8/2000 | Fischer et al. | |
| 6,166,116 A | 12/2000 | Sleeckx | |
| 6,297,307 B1 | 10/2001 | Eichenauer et al. | |
| 6,475,631 B1 | 11/2002 | Yamamoto et al. | |
| 6,663,877 B1 | 12/2003 | Appleton et al. | |
| 7,812,078 B2 | 10/2010 | Glasgow et al. | |
| 8,128,998 B2 | 3/2012 | Li et al. | |
| 8,314,182 B2 | 11/2012 | Ha et al. | |
| 9,150,701 B2 | 10/2015 | Destro et al. | |
| 9,422,426 B2 | 8/2016 | Kwon et al. | |
| 9,595,187 B2 | 3/2017 | Drovetskaya et al. | |
| 10,035,907 B2 * | 7/2018 | Park | C08L 51/06 |
| 10,058,489 B2 | 8/2018 | Drovetskaya et al. | |
| 10,472,490 B2 | 11/2019 | Yang et al. | |
| 10,472,510 B2 | 11/2019 | Lee et al. | |
| 10,544,278 B2 | 1/2020 | Bae et al. | |
| 10,787,532 B2 | 9/2020 | Kim et al. | |
| 10,815,368 B2 | 10/2020 | Kim et al. | |
| 10,829,628 B2 * | 11/2020 | Yang | A01N 59/16 |
| 11,034,620 B2 | 6/2021 | Jeong et al. | |
| 11,518,874 B2 | 12/2022 | Yang et al. | |
| 2002/0106413 A1 | 8/2002 | Herbst et al. | |
| 2002/0109805 A1 | 8/2002 | Baba | |
| 2003/0125413 A1 | 7/2003 | Herbst et al. | |
| 2005/0043485 A1 | 2/2005 | Lee et al. | |
| 2005/0131100 A1 | 6/2005 | Herbst et al. | |
| 2006/0167138 A1 | 7/2006 | Ishii et al. | |
| 2007/0009691 A1 | 1/2007 | Barre et al. | |
| 2007/0049678 A1 | 3/2007 | Kim et al. | |

(Continued)

FOREIGN PATENT DOCUMENTS

| CN | 1710153 A1 | 12/2005 |
|---|---|---|
| CN | 1919542 A | 2/2007 |

(Continued)

OTHER PUBLICATIONS

Office Action in counterpart Chinese Patent Application No. 201980078613.8 dated Jan. 20, 2023, pp. 1-6.

(Continued)

*Primary Examiner* — Hannah J Pak
(74) *Attorney, Agent, or Firm* — Additon, Pendleton & Witherspoon, P.A.

(57) ABSTRACT

A thermoplastic resin composition of the present invention comprises: about 100 parts by weight of a rubber-modified aromatic vinyl-based copolymer resin containing a rubber-modified vinyl-based graft copolymer and an aromatic vinyl-based copolymer resin; about 0.1 to about 15 parts by weight of a polyalkyl(meth)acrylate resin; about 5 to about 20 parts by weight of a polyether ester amide block copolymer; and about 0.2 to about 5 parts by weight of sodium perchlorate ($NaClO_4$). The thermoplastic resin composition is excellent in terms of static resistance, transparency, impact resistance, and the like.

9 Claims, No Drawings

(56) References Cited

U.S. PATENT DOCUMENTS

| | | | |
|---|---|---|---|
| 2007/0100038 | A1 | 5/2007 | Glasgow et al. |
| 2007/0197372 | A1 | 8/2007 | Kurihara et al. |
| 2008/0071024 | A1 | 3/2008 | Morishita et al. |
| 2009/0043047 | A1 | 2/2009 | Ha et al. |
| 2009/0054568 | A1 | 2/2009 | Uejima et al. |
| 2009/0068755 | A1 | 3/2009 | Steeves et al. |
| 2009/0166593 | A1 | 7/2009 | Kim et al. |
| 2010/0202049 | A1 | 8/2010 | Kang et al. |
| 2010/0264383 | A1 | 10/2010 | Tooley et al. |
| 2010/0296031 | A1 | 11/2010 | Lee et al. |
| 2011/0027386 | A1 | 2/2011 | Kurihara et al. |
| 2011/0152402 | A1 | 6/2011 | Jin et al. |
| 2012/0270965 | A1 | 10/2012 | Kim et al. |
| 2013/0137810 | A1 | 5/2013 | Shin |
| 2014/0017335 | A1 | 1/2014 | Dimov et al. |
| 2014/0186612 | A1 | 7/2014 | Kwon et al. |
| 2014/0296442 | A1 | 10/2014 | Fiori et al. |
| 2015/0203610 | A1 | 7/2015 | Noguchi et al. |
| 2015/0210835 | A1 | 7/2015 | Tamura et al. |
| 2015/0237866 | A1 | 8/2015 | Goudswaard et al. |
| 2015/0284559 | A1 | 10/2015 | Tai |
| 2015/0360507 | A1 | 12/2015 | Benito Lopez et al. |
| 2016/0002455 | A1 | 1/2016 | Chung et al. |
| 2016/0326360 | A1 | 11/2016 | Noguchi et al. |
| 2016/0326670 | A1 | 11/2016 | Jang et al. |
| 2017/0088704 | A1 | 3/2017 | Park |
| 2017/0190882 | A1 | 7/2017 | Park et al. |
| 2017/0198132 | A1 | 7/2017 | Choi et al. |
| 2018/0072931 | A1 | 3/2018 | Chi et al. |
| 2018/0112056 | A1 | 4/2018 | Yang et al. |
| 2018/0118914 | A1 | 5/2018 | Bae et al. |
| 2018/0179314 | A1 | 6/2018 | Kim et al. |
| 2018/0179373 | A1 | 6/2018 | Kim et al. |
| 2018/0186989 | A1 | 7/2018 | Lee et al. |
| 2018/0194164 | A1 | 7/2018 | Benito Lopez et al. |
| 2019/0299572 | A1 | 10/2019 | Hirabayashi |
| 2019/0322854 | A1 | 10/2019 | Yang et al. |
| 2020/0115279 | A1 | 4/2020 | Jeong et al. |
| 2020/0123057 | A1 | 4/2020 | An et al. |
| 2020/0216635 | A1 | 7/2020 | Chu et al. |
| 2021/0017371 | A1 | 1/2021 | Yang et al. |
| 2021/0147671 | A1 | 5/2021 | Yang et al. |
| 2021/0371654 | A1 | 12/2021 | Bae et al. |

FOREIGN PATENT DOCUMENTS

| | | |
|---|---|---|
| CN | 101001805 A | 7/2007 |
| CN | 101128537 A | 2/2008 |
| CN | 101787165 A | 7/2010 |
| CN | 101880426 A | 11/2010 |
| CN | 103068766 A | 4/2013 |
| CN | 104583329 A | 4/2015 |
| CN | 104743602 A | 7/2015 |
| CN | 105189069 A | 12/2015 |
| CN | 106700461 A | 5/2017 |
| CN | 106928662 A | 7/2017 |
| CN | 106947200 A | 7/2017 |
| CN | 107429048 A | 12/2017 |
| CN | 107974030 A | 5/2018 |
| EP | 1190622 A1 | 3/2002 |
| EP | 1510549 A1 | 3/2005 |
| EP | 3026082 A1 | 6/2016 |
| EP | 3315546 A1 | 5/2018 |
| EP | 3326975 A | 5/2018 |
| EP | 3339367 A1 | 6/2018 |
| EP | 3339370 A | 6/2018 |
| EP | 3560902 A1 | 10/2019 |
| FR | 1439417 A | 5/1966 |
| GB | 1040287 A | 8/1966 |
| JP | 55-133424 A | 10/1980 |
| JP | 56-045419 A | 4/1981 |
| JP | 62-53739 A | 3/1987 |
| JP | 63278951 A | 11/1988 |
| JP | 06-287547 A | 7/1995 |
| JP | 08-217936 A | 8/1996 |
| JP | 08-253640 A | 10/1996 |
| JP | 09-71727 A | 3/1997 |
| JP | 09-157512 A | 6/1997 |
| JP | 10-182927 A | 7/1998 |
| JP | H10195309 A | 7/1998 |
| JP | 10-213091 A | 8/1998 |
| JP | 10-251444 A | 9/1998 |
| JP | 11-035787 A | 2/1999 |
| JP | 11-228844 A | 8/1999 |
| JP | 11-263705 A | 9/1999 |
| JP | 2001-010850 A | 1/2001 |
| JP | 2001-220486 A | 8/2001 |
| JP | 2002-21774 A | 1/2002 |
| JP | 2002-068913 A | 3/2002 |
| JP | 2002-087842 A | 3/2002 |
| JP | 2003-212693 A | 7/2003 |
| JP | 2003-280546 A | 10/2003 |
| JP | 2005-239904 A | 9/2005 |
| JP | 2006-182841 A1 | 7/2006 |
| JP | 2007-191695 A | 8/2007 |
| JP | 2008-230895 A | 10/2008 |
| JP | 2009-513776 A | 4/2009 |
| JP | 2009-161758 A | 7/2009 |
| JP | 2009-173758 A | 8/2009 |
| JP | 2011-506722 A | 3/2011 |
| JP | 10-2011-0052425 A | 5/2011 |
| JP | 2011-137068 A | 7/2011 |
| JP | 2014-172783 A | 9/2014 |
| JP | 2014-221708 A | 11/2014 |
| JP | 2015-189869 A | 11/2015 |
| JP | 2016-121273 A | 7/2016 |
| JP | 2017-132913 A | 8/2017 |
| JP | 2018-090692 A | 6/2018 |
| KR | 10-1999-0028477 A | 4/1999 |
| KR | 10-0281656 A | 11/2001 |
| KR | 10-2002-0008203 A | 1/2002 |
| KR | 10-0683505 B1 | 2/2007 |
| KR | 10-0696385 B1 | 3/2007 |
| KR | 10-2007-0047073 A | 5/2007 |
| KR | 10-2007-0108008 A | 11/2007 |
| KR | 10-815472 B1 | 3/2008 |
| KR | 10-0890796 A | 3/2009 |
| KR | 10-2010-0076303 A | 7/2010 |
| KR | 10-2010-0087603 A | 8/2010 |
| KR | 10-2011-0082121 A | 7/2011 |
| KR | 10-2012-0077313 A | 7/2012 |
| KR | 10-2013-0062779 A | 6/2013 |
| KR | 10-1334283 B1 | 11/2013 |
| KR | 10-2014-0005510 A | 1/2014 |
| KR | 10-2014-0009892 A | 1/2014 |
| KR | 10-2014-0086729 A | 7/2014 |
| KR | 10-1445304 B1 | 9/2014 |
| KR | 10-1452020 | 10/2014 |
| KR | 10-2015-0017706 A | 2/2015 |
| KR | 10-2015-0037919 A | 4/2015 |
| KR | 10-2015-0137529 A | 12/2015 |
| KR | 10-2016-0006969 A | 1/2016 |
| KR | 10-2016-0083527 A | 7/2016 |
| KR | 2016-0083527 A | 7/2016 |
| KR | 10-2017-0014647 A | 2/2017 |
| KR | 10-2017-0039048 A | 4/2017 |
| KR | 10-2017-0133445 A | 12/2017 |
| KR | 10-2018-0071973 A | 6/2018 |
| RU | 2126775 C1 | 2/1999 |
| WO | 97/01515 A1 | 1/1997 |
| WO | 2014/007442 A1 | 1/2014 |
| WO | 2018/117603 A1 | 6/2018 |
| WO | 2018/124657 A1 | 7/2018 |
| WO | 2019/021738 A1 | 2/2019 |
| WO | 2019/066193 A1 | 4/2019 |
| WO | 2019/093636 A1 | 5/2019 |
| WO | 2019/132385 A1 | 7/2019 |
| WO | 2020/111552 A1 | 6/2020 |

OTHER PUBLICATIONS

International Search Report in counterpart International Application No. PCT/KR2019/014880 dated Feb. 12, 2020, pp. 1-6.

(56) References Cited

OTHER PUBLICATIONS

International Search Report in commonly owned International Application No. PCT/KR2018/010015 dated Feb. 1, 2019, pp. 1-4.
Vijayaraghavan, Rajagopala etc., "Insight into the Mechanism of Antibacterial activity of ZnO: surface defects mediated reactive oxygen species even in the dark", American Chemical Society, 2015, vol. 31, No. 33, p. 9155-9162.
International Search Report in commonly owned International Application No. PCT/KR2018/006676 dated Oct. 30, 2018, pp. 1-4.
Extended Search Report in commonly owned European Application No. 17885334.7 dated Mar. 24, 2020, pp. 1-7.
Office Action in commonly owned Japanese Application No. 2019-530736 dated Aug. 4, 2020, pp. 1-4.
International Search Report in commonly owned International Application No. PCT/KR2017/015028 dated Mar. 30, 2018, pp. 1-4.
Office Action in commonly owned U.S. Appl. No. 16/648,813 dated Dec. 14, 2021, pp. 1-12.
Machine translation of JP 11-035787 (1999, 13 pages).
Zeomic (2020, 5 pages).
STNext Abstract of JP 11-035787 (1999, 4 pages).
Machine translation of CN 101787165 (2010, 6 pages).
Machine translation of JP 10-213091 (1998, 10 pages).
Office Action in commonly owned Chinese Application No. 201880048166.7 dated May 10, 2021, pp. 1-7.
Office Action in commonly owned U.S. Appl. No. 16/470,317 mailed Oct. 1, 2020, pp. 1-10.
Office Action in commonly owned Korean Application No. 10-2015-0138243 dated Oct. 18, 2017, pp. 1-5.
Office Action in commonly owned Korean Application No. 10-2018-0142400 dated Sep. 18, 2020, pp. 1-6.
Extended Search Report in commonly owned European Application No. 18895611.4 dated Aug. 17, 2021, pp. 1-7.
Office Action in commonly owned Chinese Application No. 201880072900.3 dated Dec. 3, 2021, pp. 1-6.
International Search Report in commonly owned International Application No. PCT/KR2018/016158 dated Mar. 20, 2019, pp. 1-6.
Office Action in commonly owned U.S. Appl. No. 15/845,020 dated Jan. 29, 2020, pp. 1-10.
Office Action in commonly owned U.S. Appl. No. 16/757,492 dated May 9, 2022, pp. 1-13.
Office Action in commonly owned U.S. Appl. No. 15/844,980 dated Sep. 11, 2019, pp. 1-5.
Office Action in commonly owned U.S. Appl. No. 15/844,980 dated Mar. 10, 2020, pp. 1-10.
Office Action in commonly owned Japanese Application No. 2020-517362 dated Feb. 1, 2022, pp. 1-4.
Office Action in commonly owned U.S. Appl. No. 16,466,841 dated Jun. 1, 2020, pp. 1-14.
Office Action in commonly owned Chinese Application No. 201880063468.1 dated May 11, 2022, pp. 1-6.
Office Action in commonly owned Korean Application No. 10-2016-0177857 dated Nov. 20, 2018, pp. 1-8.
Extended Search Report in commonly owned European Application No. 17210117.2, dated Apr. 30, 2018, pp. 1-5.
Search Report in commonly owned European Application No. 17210669.2 dated Apr. 20, 2018, pp. 1-5.
Office Action in commonly owned Korean Application No. 10-2016-0184170 dated Sep. 6, 2018, pp. 1-6.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, pp. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2.
Database WPI, Week 201654, Thomson Scientific, London, GB, Abstract of KR 2016-0083527 (Kolon Plastics Inc.), pp. 1-2.
Office Action in commonly owned Korean Application No. 10-2016-0176575 dated Nov. 1, 2018, pp. 1-7.
Prasanna, et al. "Insight into the Mechanism of Antibacterial Activity of ZnO: Surface Defects Mediated Reactive Oxygen Species Even in the Dark", Langmuir 2015, vol. 31, pp. 9155-9162.
Office Action in commonly owned U.S. Appl. No. 15/798,819 mailed May 13, 2019, pp. 1-20.
Extended Search Report in commonly owned European Application No. 17209267.8 dated Mar. 26, 2018, pp. 1-7.
Office Action in commonly owned Chinese Application No. 201711007395.8 dated Jul. 31, 2019, pp. 1-6.
Office Action in commonly owned Chinese Application No. 201711062077.1 dated Jul. 12, 2019, pp. 1-7.
Office Action in commonly owned U.S. Appl. No. 15/845,020 dated Aug. 8, 2019, pp. 1-13.
Machine translated English language equivalent of JP Application No. H09-212736, which is the same as publication JP 11-035787 (1999, 10 pages).
Machine translated English language equivalent of CN 191542 (2007, 5 pages).
International Search Report in commonly owned International Application No. PCT/KR2017/015364 dated Apr. 16, 2018, pp. 1-4.
Lakshmi et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015) and its supplementary materials (pp. 6).
International Search Report in commonly owned International Application No. PCT/KR2018/006675 dated Sep. 27, 2018, pp. 1-4.

\* cited by examiner

THERMOPLASTIC RESIN COMPOSITION AND MOLDED ARTICLE FORMED THEREFROM

CROSS-REFERENCE TO RELATED APPLICATIONS

This application claims priority to and the benefit of International Application No. PCT/KR2019/014880, filed Nov. 5, 2019, which published as WO 2020/111552 on Jun. 4, 2020, and Korean Patent Application No. 10-2018-0151519, filed in the Korean Intellectual Property Office on Nov. 30, 2018, the entire disclosure of each of which is incorporated herein by reference.

TECHNICAL FIELD

The present invention relates to a thermoplastic resin composition and a molded article manufactured therefrom. More particularly, the present invention relates to a thermoplastic resin composition that exhibits good properties in terms of antistatic properties, transparency, impact resistance, and the like, and a molded article manufactured therefrom.

BACKGROUND ART

A reinforced glass product used as external materials for electric/electronic products has low impact strength, a high specific gravity causing difficulty in weight reduction of products, high manufacturing costs due to difficulty in processing and handling, and a risk of fracture. In order to overcome such drawbacks, a transparent resin replaces such a reinforced glass product. Transparent resins applicable to products requiring transparency comprise a polycarbonate resin, a transparent ABS resin, a SAN resin, a polystyrene resin, a PMMA resin, and the like.

However, a product formed of a typical transparent thermoplastic resin composition exhibits very low absorptivity with respect to moisture in air and accumulates static electricity therein without discharging the static electricity causing surface contamination, electrostatic impact, malfunction, or failure of devices through adsorption of dust in air. Although a typical antistatic agent can be used to secure antistatic properties of the transparent thermoplastic resin composition and products (molded articles) formed therefrom, an excess of the antistatic agent is used to achieve suitable antistatic properties, causing deterioration in compatibility, mechanical properties, chemical resistance, transparency, and the like of the thermoplastic resin composition.

Therefore, there is a need for development of a thermoplastic resin composition that exhibits good properties in terms of antistatic properties, transparency, impact resistance, and the like.

The background technique of the present invention is disclosed in Korean Patent Laid-open Publication No. 2007-0108008 and the like.

DISCLOSURE

Technical Problem

It is one object of the present invention to provide a thermoplastic resin composition that exhibits good properties in terms of antistatic properties, transparency, impact resistance, and the like.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises: about 100 parts by weight of a rubber-modified aromatic vinyl copolymer resin comprising a rubber-modified vinyl graft copolymer and an aromatic vinyl copolymer resin; about 0.1 to about 15 parts by weight of a poly(alkyl (meth)acrylate) resin; about 5 to about 20 parts by weight of a poly(ether ester amide) block copolymer; and about 0.2 to about 5 parts by weight of sodium perchlorate ($NaClO_4$).

2. In Embodiment 1, the rubber-modified aromatic vinyl copolymer resin may comprise about 5 wt % to about 50 wt % of the rubber-modified vinyl graft copolymer and about 50 wt % to about 95 wt % of the aromatic vinyl copolymer resin.

3. In Embodiment 1 or 2, the poly(ether ester amide) block copolymer and the sodium perchlorate may be present in a weight ratio of about 15:1 to about 25:1.

4. In Embodiments 1 to 3, the rubber-modified vinyl graft copolymer may be obtained through graft copolymerization of an alkyl (meth)acrylate, an aromatic vinyl monomer, and a vinyl cyanide monomer to a rubber polymer.

5. In Embodiments 1 to 4, the aromatic vinyl copolymer resin may be obtained through copolymerization of an alkyl (meth)acrylate, an aromatic vinyl monomer, and a vinyl cyanide monomer.

6. In Embodiments 1 to 5, the poly(ether ester amide) block copolymer may be a block copolymer of a reaction mixture comprising a salt of an amino carboxylic acid, lactam or diamine-dicarboxylic acid having 6 or more carbon atoms; polyalkylene glycol; and a dicarboxylic acid having 4 to 20 carbon atoms.

7. In Embodiments 1 to 6, the poly(alkyl (meth)acrylate) resin may have a weight average molecular weight of about 50,000 g/mol to about 130,000 g/mol and a glass transition temperature of about 90° C. to about 110° C.

8. In Embodiments 1 to 7, the thermoplastic resin composition may have a surface resistance of about $1\times10^7$ to about $5\times10^{10}$ Ω/sq, as measured in accordance with ASTM D257.

9. In Embodiments 1 to 8, the thermoplastic resin composition may have a haze value of about 2% to about 6% and a light transmittance of about 87% to about 96%, as measured on a 2.5 mm thick specimen in accordance with ASTM D1003.

10. In Embodiments 1 to 8, the thermoplastic resin composition may have a notched Izod impact strength of about 12 kgf·cm/cm to about 20 kgf·cm/cm, as measured on a ⅛" thick specimen in accordance with ASTM D256.

11. Another aspect of the present invention relates to a molded article formed of the thermoplastic resin composition according to any one of Embodiments 1 to 10.

Advantageous Effects

The present invention provides a thermoplastic resin composition that has good properties in terms of antistatic properties, transparency, impact resistance, and the like, and a molded article formed of the same.

BEST MODE

Hereinafter, embodiments of the present invention will be described in detail.

A thermoplastic resin composition according to the present invention comprises: (A) a rubber-modified aromatic vinyl copolymer resin; (B) a poly(alkyl (meth)acrylate) resin; (C) a poly(ether ester amide) block copolymer; and (D) sodium perchlorate ($NaClO_4$).

As used herein to represent a specific numerical range, the expression "a to b" means "≥a and ≤b".

(A) Rubber-Modified Aromatic Vinyl Copolymer Resin

The rubber-modified aromatic vinyl copolymer resin according to the present invention may be selected from any rubber-modified aromatic vinyl copolymer resins used in a typical transparent thermoplastic resin composition and may comprise, for example, (A1) a rubber-modified vinyl graft copolymer and (A2) an aromatic vinyl copolymer resin.

(A1) Rubber-Modified Vinyl Graft Copolymer

The rubber-modified vinyl graft copolymer according to the present invention serves to improve transparency, impact resistance, and flowability of the thermoplastic resin composition, and may be obtained through graft-copolymerization of an alkyl (meth)acrylate, an aromatic vinyl monomer and a vinyl cyanide monomer to a rubber polymer. For example, the rubber-modified vinyl graft copolymer may be obtained through graft-copolymerization of a monomer mixture comprising the alkyl (meth)acrylate, the aromatic vinyl monomer and the vinyl cyanide monomer to the rubber polymer and, optionally, the monomer mixture may further comprise a monomer for imparting processability and heat resistance. Here, the polymerization may be performed by any suitable polymerization method known in the art, such as emulsion polymerization, suspension polymerization, and mass polymerization.

In some embodiments, the rubber polymer may comprise diene rubbers, such as polybutadiene, poly(styrene-butadiene), and poly(acrylonitrile-butadiene), saturated rubbers obtained by adding hydrogen to the diene rubbers, isoprene rubbers, acrylic rubbers, such as poly(butyl acrylate), and ethylene-propylene-diene terpolymer (EPDM). These may be used alone or as a mixture thereof. For example, the rubber polymer may comprise diene rubbers, specifically a butadiene rubber.

In some embodiments, the rubber polymer (rubber particles) may have an average (z-average) particle diameter of about 0.1 μm to about 0.5 μm, for example, about 0.2 μm to about 0.4 μm. Within this range, the thermoplastic resin composition can have good properties in terms of impact resistance, heat resistance, flowability, and the like without deterioration in transparency. Here, the average (Z-average) particle diameter of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the rubber polymer may be present in an amount of about 5 wt % to about 65 wt %, for example, about 10 wt % to about 60 wt %, based on the total weight (100 wt %) of the rubber-modified vinyl graft copolymer, and the monomer mixture (comprising the alkyl (meth) acrylate, the aromatic vinyl monomer and the vinyl cyanide monomer) may be present in an amount of about 35 wt % to about 95 wt %, for example, about 40 wt % to about 90 wt %, based on 100 wt % of the rubber-modified vinyl graft copolymer. Within this range, the thermoplastic resin composition can have good properties in terms of impact resistance, transparency, heat resistance, flowability, and the like.

In some embodiments, the alkyl (meth)acrylate may be graft copolymerizable with the rubber polymer or the aromatic vinyl monomer and may comprise a $C_1$ to $C_{10}$ alkyl (meth)acrylate, for example, methyl (meth)acrylate, ethyl (meth)acrylate, propyl (meth)acrylate, butyl (meth)acrylate, and the like, specifically methyl (meth)acrylate. The alkyl (meth)acrylate may be present in an amount of about 55 wt % to about 85 wt %, for example, about 60 wt % to about 80 wt %, based on 100 wt % of the monomer mixture. Within this range, the thermoplastic resin composition can have good properties in terms of impact resistance, transparency, heat resistance, flowability, and the like.

In some embodiments, the aromatic vinyl monomer may be graft copolymerizable with the rubber polymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 40 wt %, for example, about 15 wt % to about 35 wt %, based on 100 wt % of the monomer mixture. Within this range, the thermoplastic resin composition can have good properties in terms of impact resistance, transparency, heat resistance, flowability, and the like.

In some embodiments, the vinyl cyanide monomer is a monomer copolymerizable with the aromatic vinyl monomer and may comprise, for example, acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile, methacrylonitrile, and the like. The vinyl cyanide monomer may be present in an amount of about 1 wt % to about 30 wt %, for example, about 5 wt % to about 25 wt %, based on 100 wt % of the monomer mixture. Within this range, the thermoplastic resin composition can have good properties in terms of impact resistance, transparency, heat resistance, flowability, and the like.

In some embodiments, the monomer for imparting processability and heat resistance may comprise, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the rubber-modified vinyl graft copolymer may be a methyl methacrylate-acrylonitrile-butadiene-styrene graft copolymer (g-MABS). Here, the g-MABS may comprise polybutadiene (PBD), which constitutes the rubber polymer (core), and a methyl methacrylate-acrylonitrile-styrene copolymer shell grafted to the core, in which the shell may comprise an inner shell comprising an acrylonitrile-styrene resin and an outer shell comprising poly(methyl methacrylate), without being limited thereto.

In some embodiments, the rubber-modified vinyl graft copolymer may be present in an amount of about 5 wt % to about 50 wt %, for example, about 10 wt % to about 45 wt %, based on 100 wt % of the rubber-modified aromatic vinyl copolymer resin. Within this range, the thermoplastic resin composition can exhibit good properties in terms of transparency, impact resistance, heat resistance, flowability, and balance therebetween.

(A2) Aromatic Vinyl Copolymer Resin

The aromatic vinyl copolymer resin according to the present invention serves to improve impact resistance, transparency, and the like of the thermoplastic resin composition, and may be a polymer of a monomer mixture comprising an alkyl (meth)acrylate, an aromatic vinyl monomer, and a vinyl cyanide monomer. For example, the aromatic vinyl copolymer resin may be obtained through polymerization of the monomer mixture by a polymerization method known in the art. Further, the monomer mixture may further comprise a monomer for imparting processability and heat resistance, as needed.

In some embodiments, the alkyl (meth)acrylate may be graft copolymerizable with the rubber copolymer or may be copolymerizable with the aromatic vinyl monomer, and may be a $C_1$ to $C_{10}$ alkyl (meth)acrylate, for example, methyl (meth)acrylate, ethyl (meth)acrylate, propyl (meth)acrylate, butyl (meth)acrylate, and the like, specifically methyl (meth) acrylate. The alkyl (meth)acrylate may be present in an amount of about 55 wt % to about 85 wt %, for example, about 60 wt % to about 80 wt %, based on 100 wt % of the monomer mixture. Within this range, the thermoplastic resin composition can exhibit good properties in terms of impact resistance, transparency, heat resistance, flowability, and the like.

In some embodiments, the aromatic vinyl monomer is graft copolymerizable with the rubber copolymer and may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 10 wt % to about 40 wt %, for example, about 15 wt % to about 35 wt %, based on 100 wt % of the monomer mixture. Within this range, the thermoplastic resin composition can exhibit good properties in terms of impact resistance, transparency, heat resistance, flowability, and the like.

In some embodiments, the vinyl cyanide monomer may be copolymerizable with the aromatic vinyl monomer and may comprise, for example, acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may comprise acrylonitrile, methacrylonitrile, and the like. The vinyl cyanide monomer may be present in an amount of about 1 wt % to about 30 wt %, for example, about 5 wt % to about 25 wt %, based on 100 wt % of the monomer mixture. Within this range, the thermoplastic resin composition can have good properties in terms of impact resistance, transparency, heat resistance, flowability, and the like.

In some embodiments, the monomer for imparting processability and heat resistance may comprise, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the aromatic vinyl copolymer resin may have a weight average molecular weight (Mw) of about 50,000 g/mol to about 200,000 g/mol, for example, about 100,000 g/mol to about 180,000 g/mol, as measured by gel permeation chromatography (GPC). Within this range, the thermoplastic resin exhibits good heat resistance, processability, and the like.

In some embodiments, the aromatic vinyl copolymer resin may be present in an amount of about 50 wt % to about 95 wt %, for example, about 55 wt % to about 90 wt %, based on 100 wt % of a base resin. Within this range, the thermoplastic resin composition can exhibit good properties in terms of transparency, impact resistance, heat resistance, flowability, balance therebetween, and the like.

In some embodiments, the base resin (rubber-modified aromatic vinyl copolymer resin) may be, for example, a methyl methacrylate-acrylonitrile-butadiene-styrene copolymer resin (MABS resin), which is a mixture of a methyl methacrylate-acrylonitrile-butadiene-styrene graft copolymer (g-MABS) and a methyl methacrylate-styrene-acrylonitrile copolymer resin (MSAN), without being limited thereto. Here, the MABS resin may have a structure in which g-MABS is dispersed in MSAN.

(B) Poly(Alkyl (Meth)Acrylate) Resin

The poly(alkyl (meth)acrylate) resin according to the present invention serves to improve compatibility, transparency, antistatic properties, impact resistance, and the like of the thermoplastic resin composition together with the poly (ether ester amide) block copolymer.

In some embodiments, the poly(alkyl (meth)acrylate) resin may be a polymer of a monomer comprising at least one $C_1$ to $C_{10}$ alkyl (meth)acrylate obtained by a polymerization method well-known in the art, for example, poly (methyl (meth)acrylate) (PMMA), poly(ethyl (meth)acrylate), poly(propyl (meth)acrylate), methyl (meth)acrylate, and a copolymer of a $C_2$ to $C_{10}$ alkyl (meth)acrylate, specifically poly(methyl methacrylate).

In some embodiments, the poly(alkyl (meth)acrylate) resin may be a transparent thermoplastic resin having a weight average molecular weight of about 50,000 g/mol to about 130,000 g/mol, for example, about 60,000 g/mol to about 120,000 g/mol, as measured by GPC (gel permeation chromatography). Within this range, the thermoplastic resin composition can have good transparency, impact resistance, and the like.

In some embodiments, the poly(alkyl (meth)acrylate) resin may have a glass transition temperature of about 90° C. to about 110° C., for example, about 95° C. to about 110° C. Within this range, the thermoplastic resin composition can have good heat resistance, compatibility, and the like.

In some embodiments, the poly(alkyl (meth)acrylate) resin may be present in an amount of about 0.1 to about 15 parts by weight, for example, about 1 to about 10 parts by weight, relative to about 100 parts by weight of the rubber-modified aromatic vinyl copolymer resin. If the content of the poly(alkyl (meth)acrylate) resin is less than about 0.1 parts by weight, the thermoplastic resin composition can suffer from deterioration in compatibility, antistatic properties, impact resistance, and the like, and if the content of the poly(alkyl (meth)acrylate) resin exceeds about 15 parts by weight, the thermoplastic resin composition can suffer from deterioration in antistatic properties, transparency, and the like.

(C) Poly(Ether Ester Amide) Block Copolymer

The poly(ether ester amide) block copolymer according to the present invention serves to improve antistatic properties of the thermoplastic resin composition (specimen) and may be selected from among typical poly(ether ester amide) block copolymers used as an antistatic agent, for example, a block copolymer of a reaction mixture comprising a salt of an amino carboxylic acid, lactam or diamine-dicarboxylic acid having 6 or more carbon atoms; polyalkylene glycol; and a dicarboxylic acid having 4 to 20 carbon atoms.

In some embodiments, the salt of the amino carboxylic acid, lactam, or diamine-dicarboxylate having 6 or more carbon atoms may comprise aminocarboxylic acids, such as ω-aminocaproic acid, ω-aminoenanthic acid, ω-aminocaprylic acid, ω-aminopelargonic acid, ω-aminocapric acid, 1,1-aminoundecanoic acid, 1,2-aminododecanoic acid, and the like; lactams, such as caprolactam, enantolactam, laurolactam, and the like; and salts of diamines and dicarboxylic acids, such as salts of hexamethylenediamine-adipic acid, salts of hexamethylenediamine-isophthalic acid, and the like. For example, 1,2-aminododecanoic acid, caprolactam, and salts of hexamethylenediamine-adipic acid may be used.

In some embodiments, the polyalkylene glycol may comprise polyethylene glycol, poly(1,2- and 1,3-propylene glycol), polytetramethylene glycol, polyhexamethylene glycol, a block or random copolymer of ethylene glycol and propylene glycol, and a copolymer of ethylene glycol and tetrahydrofuran. For example, polyethylene glycol, a copolymer of ethylene glycol and propylene glycol, and the like may be used.

In some embodiments, the $C_4$ to $C_{20}$ dicarboxylic acid may comprise terephthalic acid, 1,4-cyclohexacarboxylic acid, sebacic acid, adipic acid, and dodecane carboxylic acid.

In some embodiments, a bond between the salt of the amino carboxylic acid, lactam or diamine-dicarboxylic acid having 6 or more carbon atoms and the polyalkylene glycol may be an ester bond; a bond between the salt of the amino carboxylic acid, lactam or diamine-dicarboxylic acid having 6 or more carbon atoms and the $C_4$ to $C_{20}$ dicarboxylic acid may be an amide bond; and a bond between the polyalkylene glycol and the $C_4$ to $C_{20}$ dicarboxylic acid may be an ester bond.

In some embodiments, the poly(ether ester amide) block copolymer may be prepared by a method well-known in the art, for example, by a method disclosed in JP Patent Publication No. S56-045419 or JP Unexamined Patent Publication No. S55-133424.

In some embodiments, the poly(ether ester amide) block copolymer may comprise about 10 wt % to about 95 wt % of the polyether-ester block. Within this range, the thermoplastic resin composition can have good antistatic properties, heat resistance, and the like.

In some embodiments, the poly(ether ester amide) block copolymer may be present in an amount of about 5 to about 20 parts by weight, for example, about 7 to about 15 parts by weight, relative to about 100 parts by weight of the rubber-modified aromatic vinyl copolymer resin. If the content of the poly(ether ester amide) block copolymer is less than about 5 parts by weight, the thermoplastic resin composition can suffer from deterioration in antistatic properties, and if the content of the poly(ether ester amide) block copolymer exceeds about 20 parts by weight, the thermoplastic resin composition can suffer from deterioration in impact resistance, transparency, and the like.

(D) Sodium Perchlorate

According to the present invention, sodium perchlorate ($NaClO_4$) serves to improve antistatic properties, impact resistance and the like of the thermoplastic resin composition together with the poly(ether ester amide) block copolymer.

In some embodiments, the sodium perchlorate may be present in an amount of about 0.2 to about 5 parts by weight, for example, about 0.3 to about 5 parts by weight, relative to about 100 parts by weight of the rubber-modified aromatic vinyl copolymer resin. If the content of the sodium perchlorate is less than about 0.2 parts by weight, the thermoplastic resin composition can suffer from deterioration in transparency, antistatic properties, chemical resistance, and the like, and if the content of the sodium perchlorate exceeds about 5 parts by weight, the thermoplastic resin composition can suffer from deterioration in impact resistance, transparency, and the like.

In some embodiments, the poly(ether ester amide) block copolymer and the sodium perchlorate may be present in a weight ratio of about 15:1 to about 25:1, for example, about 16:1 to about 23:1. Within this range, the thermoplastic resin composition can exhibit good properties in terms of antistatic properties, transparency (transmittance, haze), and the like.

According to one embodiment of the invention, the thermoplastic resin composition may further comprise additives, such as flame retardants, fillers, an antioxidant agent, a lubricant, a release agent, a nucleating agent, a stabilizer, a colorant, and a mixture thereof, without being limited thereto. The additives may be present in an amount of about 10 parts by weight or less, for example, about 0.01 to about 10 parts by weight, relative to about 100 parts by weight of the base resin (the rubber-modified aromatic vinyl copolymer resin), without being limited thereto.

According to one embodiment of the invention, the thermoplastic resin composition may be prepared in pellet form by mixing the aforementioned components, followed by melt extrusion using a typical twin-screw extruder at about 200° C. to about 280° C., for example, about 210° C. to about 250° C.

In some embodiments, the thermoplastic resin composition may have a surface resistance of about $1 \times 10^7$ Ω/sq to about $5 \times 10^{10}$ Ω/sq, for example, about $1 \times 10^7$ Ω/sq to about $2 \times 10^{10}$ Ω/sq, as measured on a specimen having a size of 10 mm×10 mm×3.2 mm in accordance with ASTM D257.

In some embodiments, the thermoplastic resin composition may have a haze value of about 2% to about 6%, for example, about 2% to about 5.5%, and a light transmittance of about 87% to about 96%%, for example, about 88% to about 96%, as measured on a 2.5 mm thick specimen in accordance with ASTM D1003.

In some embodiments, the thermoplastic resin composition may have an Izod impact strength of about 12 kgf·cm/cm to about 20 kgf·cm/cm, for example, about 13 kgf·cm/cm to about 20 kgf·cm/cm, as measured on a ⅛" thick specimen in accordance with ASTM D256.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, casting, and the like. Such molding methods are well known to those skilled in the art. The molded articles exhibit good properties in terms of antistatic properties, transparency, impact resistance, and balance therebetween, and thus may be used in various fields comprising interior/exterior materials for electric/electronic products, and the like. In particular, the molded article is useful as materials for semiconductor trays and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Rubber-modified aromatic vinyl copolymer resin (A1) Rubber-modified vinyl graft copolymer A core-shell type graft copolymer (g-MABS) obtained through graft copolymerization of 45 wt % of styrene, acrylonitrile and methyl methacrylate (styrene/acrylonitrile/methyl methacrylate: 20 wt %/10 wt %/70 wt %) to 55 wt % of butadiene rubber particles having an average particle diameter of 0.28 m was used.

(A2) Aromatic vinyl copolymer resin

A resin (weight average molecular weight: 160,000 g/mol) obtained through polymerization of 70 wt % of methyl methacrylate, 20 wt % of styrene and 10 wt % of acrylonitrile was used.

(B) Poly(alkyl (meth)acrylate) resin

Poly(methyl methacrylate) resin (PMMA, weight average molecular weight: 70,000 g/mol, glass transition temperature: 106° C.) was used.

(C) Antistatic agent (C1) Poly(ether ester amide) block copolymer (PA6-PEO, Manufacturer: Sanyo, Model: PELECTRON AS) was used.

(C2) PP-PEO olefin-based antistatic agent (Manufacturer: Sanyo, Model: UC) was used.

(D1) Sodium perchlorate (NaClO$_4$, Manufacturer: Calibre Chemical) was used.

(D2) LiClO$_4$ (Manufacturer: Sigma Aldrich, 98%) was used.

(D3) NaBF$_4$ (Manufacturer: Sigma Aldrich, 98%) was used.

Examples 1 to 3 and Comparative Examples 1 to 5

The above components were mixed in amounts as listed in Table 1 and subjected to melt-extrusion using a twin-screw extruder (L/D=36, (D: Φ45 mm) under conditions of 230° C. and 250 rpm, thereby preparing pellets. The prepared pellets were dried at 80° C. for 4 hours or more and injection-molded in a 6 oz. injection molding machine (molding temperature: 230° C., mold temperature: 60° C.), thereby preparing specimens. The prepared specimens were evaluated as to the following properties by the following method, and results are shown in Table 1.

Property Measurement (1) Surface resistance (unit: Q/sg): Surface resistance was measured on a specimen having a size of 10 mm×10 mm×3.2 mm using a surface resistance tester (Model: Hiresta-UP (MCP-HT450), Manufacturer: Mitsubishi Chemical Co., Ltd.) in accordance with ASTM D257.

(3) Haze and transmittance (unit: %): Haze and transmittance were measured on a 2.5 mm thick specimen using a haze meter NDH 2000 (Nippon Denshoku Co., Ltd.) in accordance with ASTM D1003.

(3) Notched Izod impact resistance (kgf·cm/cm): Notched Izod impact strength was measured on a ⅛" thick specimen in accordance with ASTM D256.

TABLE 1

|  |  | Example | | | Comparative Example | | | | |
| --- | --- | --- | --- | --- | --- | --- | --- | --- | --- |
|  |  | 1 | 2 | 3 | 1 | 2 | 3 | 4 | 5 |
| (A) (wt %) | (A1) | 30 | 30 | 30 | 30 | 30 | 30 | 30 | 30 |
|  | (A2) | 70 | 70 | 70 | 70 | 70 | 70 | 70 | 70 |
| (B) (parts by weight) |  | 5 | 5 | 5 | 5 | 5 | 5 | 5 | 5 |
| (C) (parts by weight) | (C1) | 7 | 10 | 15 | — | 10 | 10 | 3 | 21 |
|  | (C2) | — | — | — | 10 | — | — | — | — |
| (D) (parts by weight) | (D1) | 0.4 | 0.5 | 0.7 | 0.5 | — | — | 6 | 0.1 |
|  | (D2) | — | — | — | — | 0.5 | — | — | — |
|  | (D3) | — | — | — | — | — | 0.5 | — | — |
| Surface resistance (Ω/sq) |  | $2 \times 10^{10}$ | $1 \times 10^9$ | $5 \times 10^8$ | $3 \times 10^{11}$ | $8 \times 10^{10}$ | $6 \times 10^{10}$ | $5 \times 10^{11}$ | $2 \times 10^9$ |
| Haze (%) |  | 3.2 | 3.5 | 5.0 | 9.0 | 8.0 | 8.5 | 91 | 6.0 |
| Light transmittance (%) |  | 91 | 90 | 88 | 84 | 86 | 85 | 20 | 87 |
| Notched Izod impact strength (kgf · cm/cm) |  | 15 | 15 | 17 | 11 | 15 | 15 | 8 | 18 |

*parts by weight: parts by weight relative to 100 parts by weight of base resin (A)

From the results, it could be seen that the thermoplastic resin compositions (Examples 1 to 3) according to the present invention exhibited good properties in terms of antistatic properties, impact resistance, transparency, and balance therebetween.

On the contrary, it could be seen that the thermoplastic resin composition of Comparative Example 1 prepared using the olefin antistatic agent (C2) instead of the poly(ether ester amide) block copolymer suffered from deterioration in impact resistance, transparency, and the like, and the thermoplastic resin composition of Comparative Examples 2 and 3 prepared using LiClO$_4$ (D2) and NaBF$_4$ (D3) instead of sodium perchlorate (NaClO$_4$) suffered from deterioration in transparency (transmittance, haze) and the like. Further, it could be seen that the thermoplastic resin composition (Comparative Example 4) prepared using a small amount of the poly(ether ester amide) block copolymer and an excess of sodium perchlorate suffered from deterioration in impact resistance, transparency, and the like, and the thermoplastic resin composition (Comparative Example 5) prepared using an excess of the poly(ether ester amide) block copolymer and a small amount of sodium perchlorate suffered from deterioration in transparency (transmittance, haze) and the like.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a rubber-modified aromatic vinyl copolymer resin comprising a rubber-modified vinyl graft copolymer and an aromatic vinyl copolymer resin;
   about 0.1 to about 15 parts by weight of a poly(alkyl (meth)acrylate) resin having a weight average molecular weight of about 50,000 g/mol to about 130,000 g/mol and a glass transition temperature of about 90° C. to about 110° C.;
   about 5 to about 20 parts by weight of a poly(ether ester amide) block copolymer; and
   about 0.2 to about 5 parts by weight of sodium perchlorate ($NaClO_4$),
   wherein the thermoplastic resin composition has a haze value of about 2% to about 6% and a light transmittance of about 87% to about 96%, as measured on a 2.5 mm thick specimen in accordance with ASTM D1003.

2. The thermoplastic resin composition according to claim 1, wherein the rubber-modified aromatic vinyl copolymer resin comprises about 5 wt % to about 50 wt % of the rubber-modified vinyl graft copolymer and about 50 wt % to about 95 wt % of the aromatic vinyl copolymer resin.

3. The thermoplastic resin composition according to claim 1, wherein the poly(ether ester amide) block copolymer and the sodium perchlorate are present in a weight ratio of about 15:1 to about 25:1.

4. The thermoplastic resin composition according to claim 1, wherein the rubber-modified vinyl graft copolymer is obtained through graft copolymerization of an alkyl (meth)acrylate, an aromatic vinyl monomer, and a vinyl cyanide monomer to a rubber polymer.

5. The thermoplastic resin composition according to claim 1, wherein the aromatic vinyl copolymer resin is obtained through copolymerization of an alkyl (meth)acrylate, an aromatic vinyl monomer, and a monomer copolymerizable with the aromatic vinyl monomer.

6. The thermoplastic resin composition according to claim 1, wherein the poly(ether ester amide) block copolymer is a block copolymer of a reaction mixture comprising a salt of an amino carboxylic acid, lactam or diamine-dicarboxylic acid having 6 or more carbon atoms; polyalkylene glycol; and a dicarboxylic acid having 4 to 20 carbon atoms.

7. The thermoplastic resin composition according to claim 1, wherein the thermoplastic resin composition also has a surface resistance of about $1\times10^7$ to about $5\times10^{10}$ Ω/sq, as measured in accordance with ASTM D257.

8. The thermoplastic resin composition according to claim 1, wherein the thermoplastic resin composition also has a notched Izod impact strength of about 12 kgf·cm/cm to about 20 kgf·cm/cm, as measured on a ⅛" thick specimen in accordance with ASTM D256.

9. A molded article formed of the thermoplastic resin composition according to claim 1.

* * * * *